United States Patent
Gotwalt et al.

(10) Patent No.: US 8,305,380 B2
(45) Date of Patent: Nov. 6, 2012

(54) MANAGING RESOURCES TO FACILITATE ALTERING THE NUMBER OF ACTIVE PROCESSORS

(75) Inventors: David Gotwalt, Winter Springs, FL (US); Oleksandr Khodorkovsky, Toronto (CA)

(73) Assignees: Advanced Micro Devices, Inc., Sunnyvale, CA (US); ATI Technologies UTC, Markham, Ontario (CA)

( * ) Notice: Subject to any disclaimer, the term of this patent is extended or adjusted under 35 U.S.C. 154(b) by 275 days.

(21) Appl. No.: 12/695,863

(22) Filed: Jan. 28, 2010

(65) Prior Publication Data

US 2011/0057936 A1    Mar. 10, 2011

Related U.S. Application Data

(60) Provisional application No. 61/240,872, filed on Sep. 9, 2009.

(51) Int. Cl.
*G06F 15/16* (2006.01)
*G06F 13/00* (2006.01)

(52) U.S. Cl. .................. 345/502; 345/504; 345/537

(58) Field of Classification Search .................. 345/501, 345/502, 504, 536, 537
See application file for complete search history.

(56) References Cited

U.S. PATENT DOCUMENTS

| | | | |
|---|---|---|---|
| 7,330,922 B2 * | 2/2008 | Paquette et al. | 710/302 |
| 7,940,276 B2 * | 5/2011 | Stauffer et al. | 345/522 |
| 8,199,155 B2 * | 6/2012 | Leroy et al. | 345/502 |
| 2004/0068620 A1 | 4/2004 | Van Doren et al. | |
| 2004/0215987 A1 | 10/2004 | Farkas et al. | |
| 2007/0091099 A1 | 4/2007 | Zhang et al. | |
| 2008/0034238 A1 | 2/2008 | Hendry et al. | |
| 2009/0153528 A1 | 6/2009 | Orr | |
| 2009/0222654 A1 | 9/2009 | Hum et al. | |
| 2009/0292887 A1 * | 11/2009 | Manczak et al. | 711/162 |
| 2010/0211958 A1 * | 8/2010 | Madison et al. | 718/105 |

FOREIGN PATENT DOCUMENTS

WO  WO 2007/140404 A2   12/2007
WO  WO 2009/038902 A1   3/2009

OTHER PUBLICATIONS

International Search Report and Written Opinion for International Application No. PCT/US2010/048093, mailed on Dec. 14, 2010, 10 pages.

* cited by examiner

*Primary Examiner* — Jacinta M Crawford
(74) *Attorney, Agent, or Firm* — Sterne, Kessler, Goldstein & Fox PLLC (57) ABSTRACT

A method of managing resources is provided. The method includes identifying a resource associated with a processor responsive to an impending transition, and copying the identified resource from a memory associated with the GPU or to the memory associated with the GPU.

18 Claims, 8 Drawing Sheets

MANAGING RESOURCES TO FACILITATE ALTERING THE NUMBER OF ACTIVE PROCESSORS

CROSS REFERENCE TO RELATED APPLICATIONS

This application claims the benefit of U.S. Provisional Appl. No. 61/240,872, filed Sep. 9, 2009, which is incorporated by reference herein in its entirety.

BACKGROUND OF THE INVENTION

1. Field of the Invention

The present invention generally relates to graphics processing and more particularly to managing aspects of a multiple processor environment.

2. Background Art

Some computer systems have multiple processors such as, for example, multiple coprocessors such as those found in graphics processing systems which may include multiple graphics processing units (GPUs) (which may be embodied in multiple boards, ASICs, or multiple cores) to allow for performance gains through parallel processing of graphics tasks. For example, a graphics-intensive application may be running that requires or can benefit from having the additional processing power provided by using multiple GPUs. Other applications, however, do not benefit from such increased processing power. When these applications are being run, one or more GPUs may not be used.

In some operating systems, power can be saved by turning off unused GPUs. When GPUs are shut down, resources stored on memories associated with those GPUs can be lost or become out-of-date. Thus, unused GPUs may have to remain powered so that resources stored on their associated memories remain accessible to other GPUs of the system. Keeping unused GPUs powered results in the system using more power and, in the case of mobile systems, results in a shorter battery life.

What is needed, then, are methods and systems that allow for resources to be preserved when unused processors (such as, for example, unused GPUs) are turned off.

BRIEF SUMMARY

Embodiments described herein relate to managing resources stored in memories so that states of processors (e.g., GPUs) in a multi-processor environment can be changed to save power. For example, resources of a first processor (e.g., a slave processor) may be preserved by copying the resources to a memory associated with a second processor (e.g., a master processor) before the first processor and associated memory transitions to a sub-operational state.

In an embodiment, a method of managing resources includes identifying a resource associated with a processor responsive to an impending transition and copying the identified resource from a memory associated with the GPU or to the memory associated with the GPU.

In another embodiment, a system for managing power includes a processor and a memory in communication with the processor. The memory stores a plurality of processing instructions for directing the processor to identify a resource associated with a processor responsive to an impending transition and copy the identified resource from a memory associated with the processor or to the memory associated with the processor.

In another embodiment, a computer readable medium is provided that carries one or more sequences of one or more instructions for execution by one or more processors to perform a method of managing resources, the instructions when executed by the one or more processors, cause the one or more processors to: identify a resource associated with the processor responsive to an impending transition, and perform at least one from the group including (i) copying the identified resource from a memory associated with the processor and (ii) copying the identified resource to the memory associated with the processor.

Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF EMBODIMENTS OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

Figure 1:
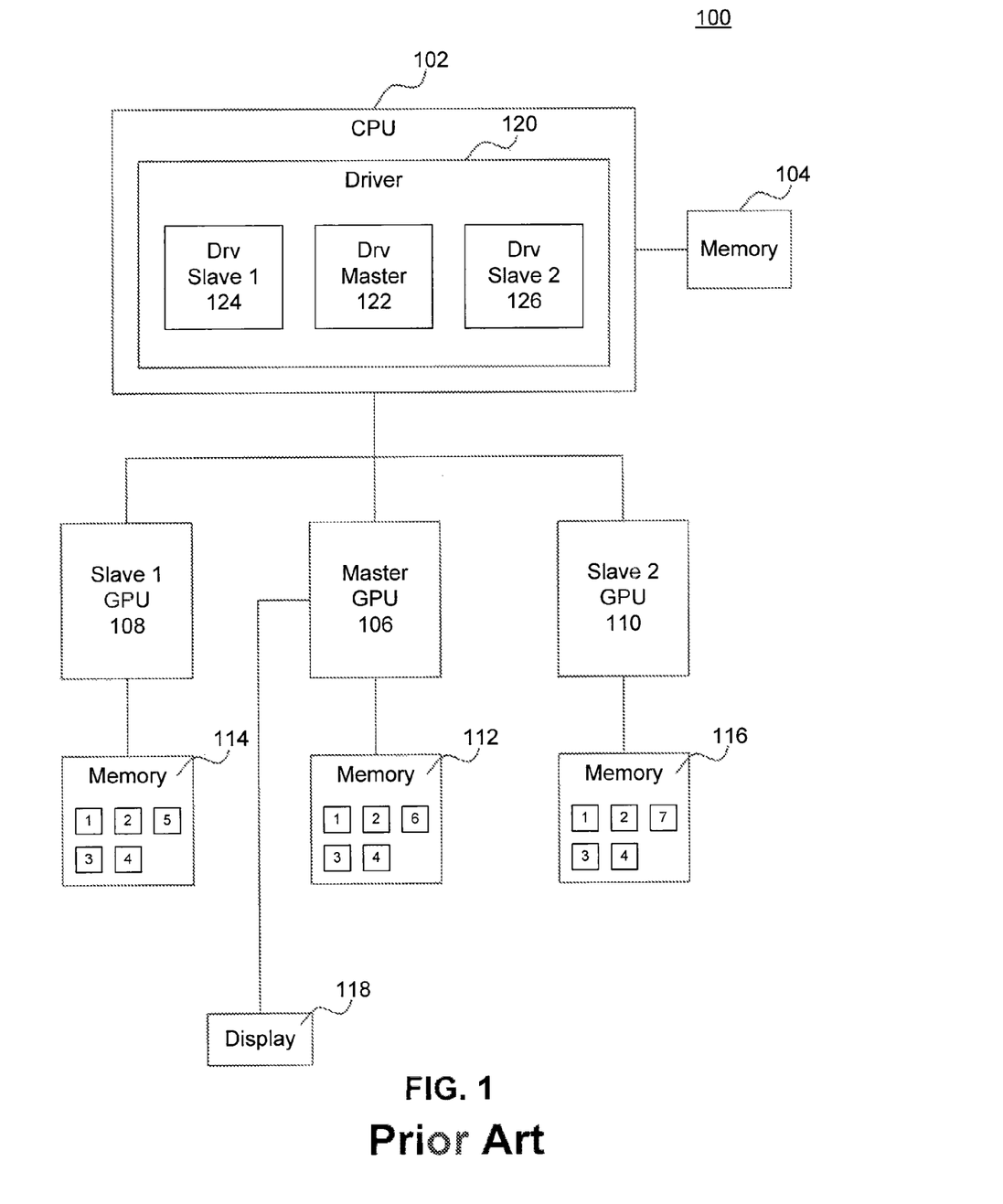
FIG. 1 shows a block diagram of a conventional graphics computing environment.

FIG. 1 shows a computing environment 100 that includes a central processing unit (CPU) 102, a memory 104, a master graphics processing unit (GPU) 106, first and second slave GPUs 108 and 110, memories 112-116, and a display 118.

A driver 120 is a program that runs on CPU 102. Driver 120 includes a master-specific driver 122 that handles operations specific to master GPU 106 and slave-specific drivers 124 and 126 that handle operations specific to first and second slave GPUs 108 and 110, respectively. In an embodiment, driver 120 controls the operation of GPUs 106-110. For example, driver 120 can assign graphics tasks to each of GPUs 106-110.

As would be understood by those skilled in the relevant arts based on the description herein, GPUs 106-110 can be used to perform a variety of graphics tasks such as rendering and driving a display. As shown in FIG. 1, computing environment 100 has two types of GPUs, a master GPU and slave GPUs. In an embodiment, a master GPU is the GPU that drives the display and slave GPUs are GPUs that do not drive a display. For example, as shown in FIG. 1, master GPU 106 drives display 118. Display 118 can be a variety of different types of displays such as a monitor or other screen. In alternate embodiments, master GPU 106 can drive display 118 through one or more components (not shown in FIG. 1), such as a multiplexer.

In another embodiment, a slave GPU can be used to drive a display. In such an embodiment, the master GPU can be the highest power consuming GPU that has the most processing power.

GPUs 106, 108, and 110 are coupled to associated memories 112, 114, and 116, respectively. As shown in FIG. 1, each of memories 112-116 stores resources. For example, memory 112 stores some resources 1, 2, 3, 4, and 6. Similarly, memories 114 and 116 store resources 1, 2, 3, 4, and 5, and resources 1, 2, 3, 4, and 7, respectively. Thus, memories 112-116 store resources that are stored in all the memories, e.g., resources 1, 2, 3, and 4, and store other resources that are only available on that particular memory, e.g., resources 5, 6, and 7. In an embodiment, one or more of resources 1-7 include a surface rendered by a respective GPU of GPUs 106-110 or other types of data produced by GPUs. In another embodiment, one or more of resources 1-7 include a surface or other data generated by CPU 102.

Having all of GPUs 106-110 complete graphics processing tasks in parallel provide enhanced performance. In other situations, however, the enhanced performance provided by having multiple GPUs active requires too much power usage or is not needed. For example, when the system is being powered by DC power, e.g., a battery, power savings may be more important than graphics performance and it may be desired to shut down power to slave GPU 108 and/or slave GPU 110. In another example, CPU 102 may not be running any applications, e.g., graphics-intensive games, which benefit from or require all of GPUs 106-110 to be active. In such an example, one or more of slave GPUs 108 and 110 may be inactive, i.e., not processing any graphics tasks. As shown in FIG. 1, slave GPUs 108 and 110 cannot be shut down or otherwise deactivated because their associated memories store resources that are not stored elsewhere. Thus, GPUs 108 and 110 may have to continue to remain powered even when they are inactive and/or when the system is being powered by a limited power source (e.g., DC power).

In embodiments described herein, methods and systems are provided that manage resources to allow one or more GPUs to be switched from a powered state to a sub-operational power state. For example, methods and systems described herein allow for resources specific to a slave GPU that will transition to a sub-operational power state to be copied to the memory associated with another (e.g., master) GPU that will remain in a powered state so that the resources will not be lost. Moreover, the resources lost while the slave was in the sub-operational power state or which have become out-of-date can be provided back to the slave GPU when it returns to powered state.

In an embodiment, a processor (e.g., a GPU) is in a powered state is state when power is supplied such that the resources in a memory associated with the processor are not lost and remain up to date. For example, a powered state can be a state where all of the circuit blocks of the GPU are fully powered and where a memory is refreshed as normal and access to the contents of the memory is enabled.

In a sub-operational power state, at least some resources stored in a memory associated with the processor are lost or become out-of-date. For example, a GPU can have its settings switched to sub-operational levels. For example, the operating frequencies of the GPU can be substantially reduced, the operating voltage of the GPU can be set just high enough to maintain the reduced operating frequencies, circuit blocks such as phase-locked loops (PLLs) and input/output (I/O) pads can be completely shut-down. Similarly, in a sub-operational power state a memory can have its setting switched to sub-operational levels. For example, memory accesses can be disabled and memory can be switched to self-refresh mode. In another embodiment, a GPU or a memory in a sub-operational power state can be completely shut down.

Figure 2:
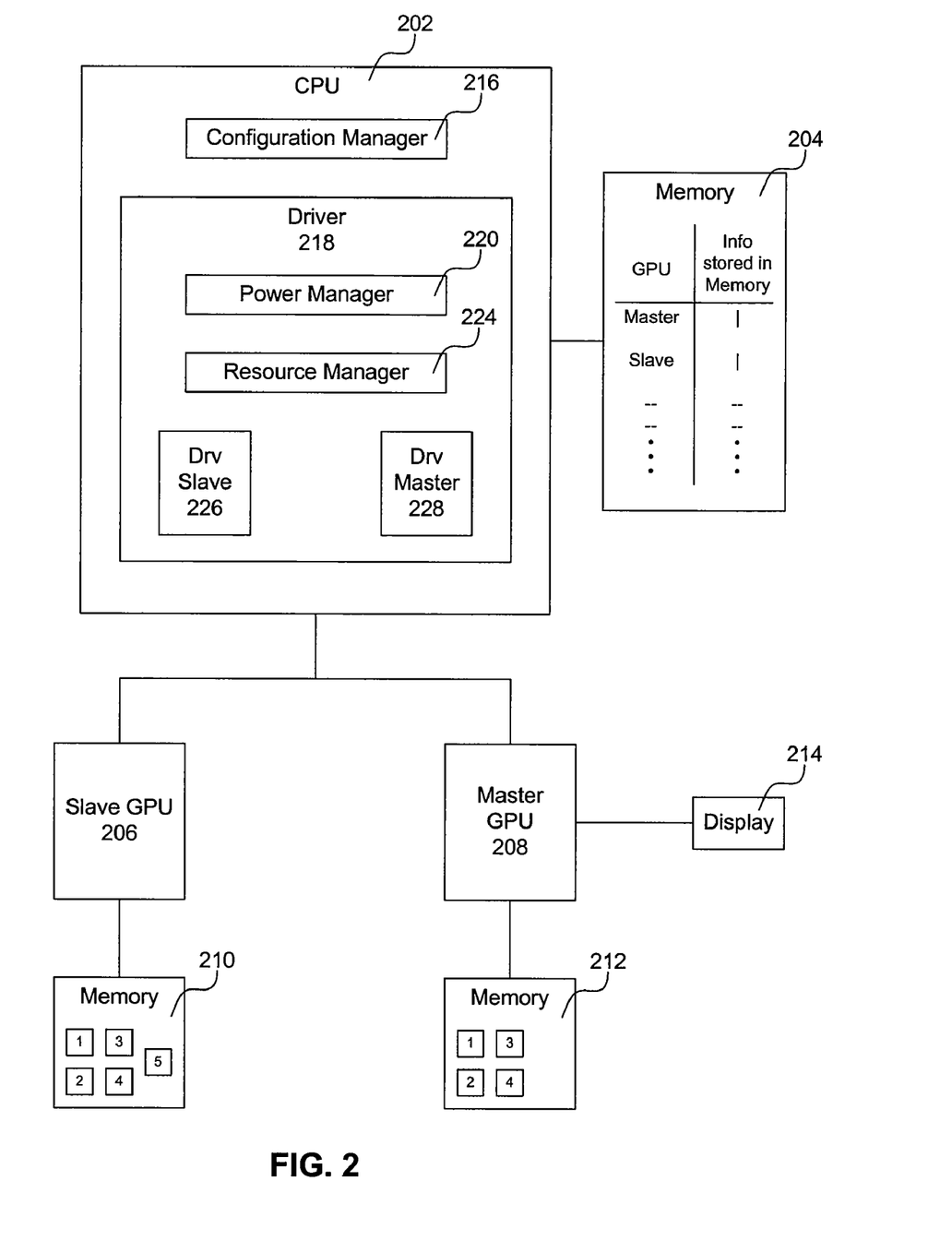
FIG. 2 shows a block diagram of a graphics computing environment, according to an embodiment of the present invention.

FIG. 2 shows a computing environment 200, according to an embodiment of the present invention. Computing environment 200 includes a CPU 202, a memory 204, a slave GPU 206, a master GPU 208, memories 210 and 212, and a display 214. As will be understood by those of ordinary skill in the art, GPUs 206 and 208 may form part of other devices such as part of a single (or multiple) CPUs, part of a single device (e.g., an ASIC with multiple GPU cores), part of different devices (such as, for example, a northbridge) or combinations thereof.

Computing environment 200 is shown with only a single slave GPU 206 and a single master GPU 208 only for the sake of simplicity. As would be appreciated by those skilled in the relevant arts based on the description herein, embodiments described herein can also be applied to systems that include more than one master GPU or slave GPU. GPUs 206 and 208 can be used to perform a variety of graphics tasks such as rendering and driving a display. Master GPU 208 is coupled to a display 214. In an embodiment, display 214 is substantially similar to display 118, described with reference to FIG. 1.

GPUs 206 and 208 are coupled to associated memories 210 and 212, respectively. As shown in FIG. 2, both of memories 210 and 212 store resources 1, 2, 3, and 4, while only memory 210 stores resource 5.

CPU 202 has a configuration manager module 216 and a driver 218 running on it. In an embodiment, CPU 202 is coupled to a memory, e.g., memory 204 or other memory not shown in FIG. 2, that stores instructions directing CPU 202 to run configuration manager 216 and/or driver 218. Configuration manager 216 receives information regarding a system event and determines a configuration for GPUs 206 and 208.

In particular, configuration manager assigns graphics responsibilities to each of GPUs 206 and 208 based on system events. System events can include, for example, switching from AC power, e.g., wall socket power, to DC power, e.g., battery power. In such an embodiment, one of GPUs 206 and 208 can be switched to a sub-operational power state to save power. In another embodiment, GPU 206 is a high performance GPU and GPU 208 is a comparably lower performance GPU that also uses less power than GPU 206. In such an embodiment, when the power source is switched from AC power to DC power, high performance GPU 206 can be switched to a sub-operational power state and comparably lower performance GPU 208 can be switched to a powered state. When the power source is switched from DC power to AC power, high performance GPU 206 can be switched from the sub-operational power state to a powered state and comparably lower performance GPU 208 can be switched to a powered state.

Other system events can include the starting or stopping of an application that requires or benefits from additional graphics processing capabilities. The operation of configuration manager 216 will be described further with respect to FIGS. 3-7.

Driver 218 controls the operation of GPUs 206 and 208. Driver 218 includes a power manager module 220, a resource manager module 224, a slave-specific module 226, and a master-specific module 228. Power manager module 220 receives the GPU configuration determined by configuration manager 216 and determines a power state for each of GPUs 206 and 208. For example, power manager module 220 can determine that slave GPU 206 will transition to a sub-operational power state or a powered state based on the responsibilities assigned to it by configuration manager 216—this can be referred to as an upcoming or impending transition. Resource manager module 224 manages the resources of memories 210 and 212 so that resources are not lost when the GPUs are transitioned to a sub-operational power state. The impending or upcoming transition may be the result of an indication received, for example, from an application or user input.

In an embodiment, resource manager module 224 accesses memory 204 to identify resources that must be copied from one memory to another. For example, resource manager module 224 can access a lookup table stored in memory 204 to identify resources that are stored in one memory and not in another. Such a lookup table can be implemented as a linked list, an array, or other data structure as would be known to those skilled in the relevant arts based on the description herein. As shown in FIG. 2, the lookup table stored in memory 204 is indexed by the GPU to which the memory holding that resource is associated. In other embodiments, the lookup table can be indexed in other ways, such as based on the resource. Slave-specific module 226 and master-specific module 228 correspond to slave GPU 206 and master GPU 208, respectively. In an embodiment, slave-specific module 226 and master-specific module 228 facilitate interactions between CPU 202 and GPUs 206 and 208. The operation of computing environment 200 with regards to managing resources in response to system events will be described further with respect to FIGS. 3-6.

Figure 3:
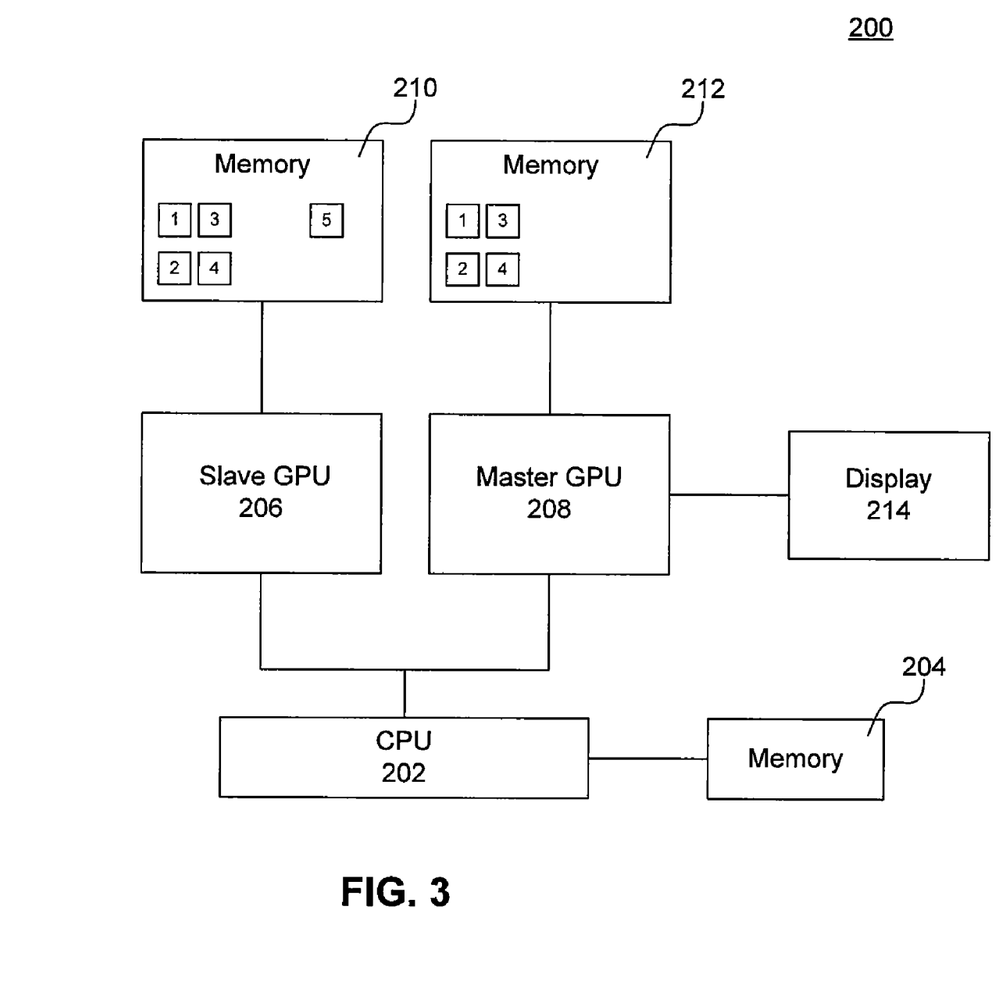
FIGS. 3-6 are simplified diagrams of the computing environment shown in FIG. 2, according to embodiments of the present invention.

FIG. 3 shows a simplified diagram of computing environment 200 when both slave GPU 206 and master GPU 208 are in powered states. As shown in FIG. 3, memory 210 (associated with slave GPU 206) stores resource 5 that is not stored in memory 212 (associated with master GPU 208).

Figure 4:
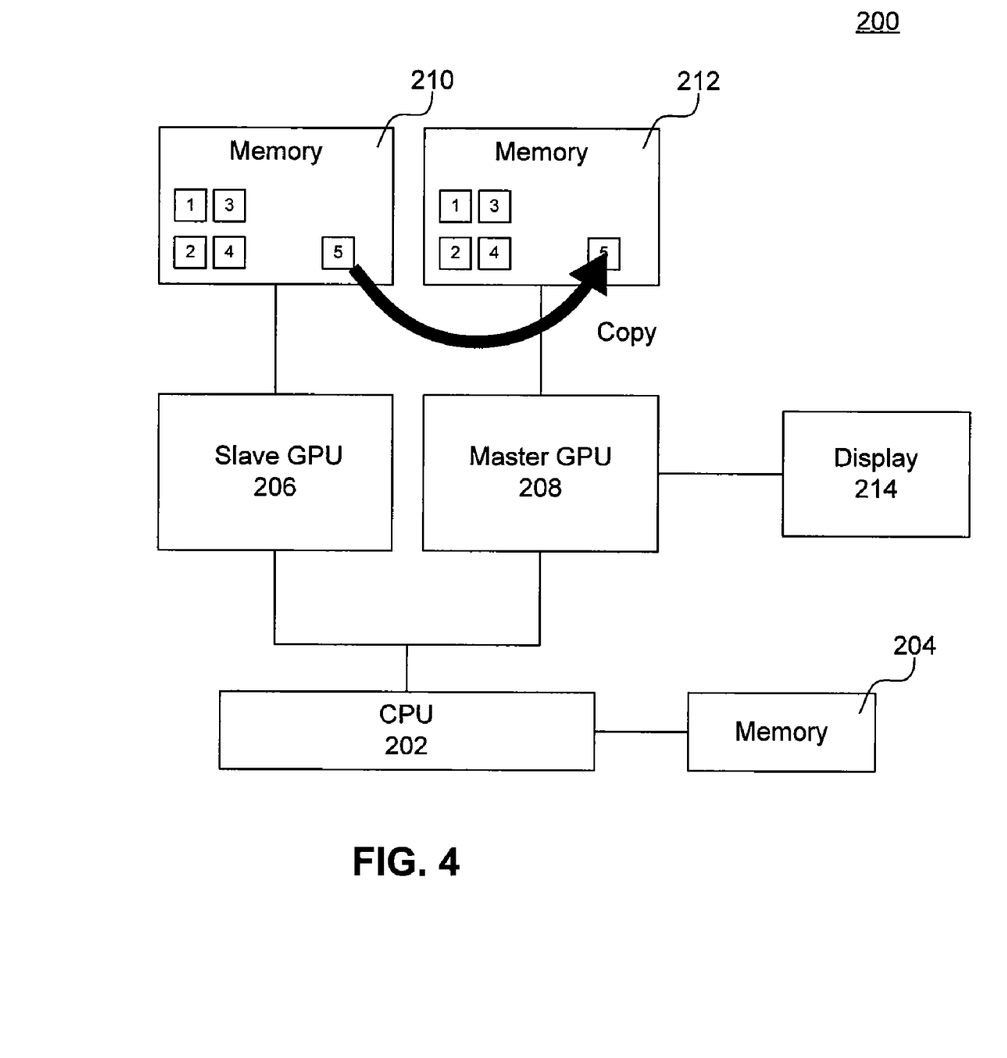

FIG. 4 shows a simplified diagram of system 200 after configuration manager 216 determines that a system event has occurred and that all graphics responsibilities will be assigned to master GPU 208. For example, configuration 216 may receive information indicating that power source has been switched to DC power, e.g. a battery that can only provide power for a limited amount of time making power usage more of a concern than graphics processing performance.

Power manager module 220 running on CPU 202 receives the GPU configuration determined by configuration 216, and determines power states for slave GPU 206 and master GPU 208. For example, power manager module 220 determines that slave GPU 206 and its associated memory 210 will be switched to a sub-operational power state and that master GPU 208 will remain in a powered state. Resource manager module 224 receives the determined power states for GPUs 206 and 208 and determines whether memory 210 is storing resources that need to be preserved. For example, upon receiving information that slave GPU 206 and its associated memory 210 will be switched to a sub-operational power state, resource manager module 224 accesses memory 204, and specifically the lookup table stored in memory 204, and identifies resource 5 as being stored on memory 210 and not in memory 212. Resource manager module 224 then directs slave GPU 206 and master GPU 208 to copy resource 5 from memory 210 to memory 212.

Figure 5:
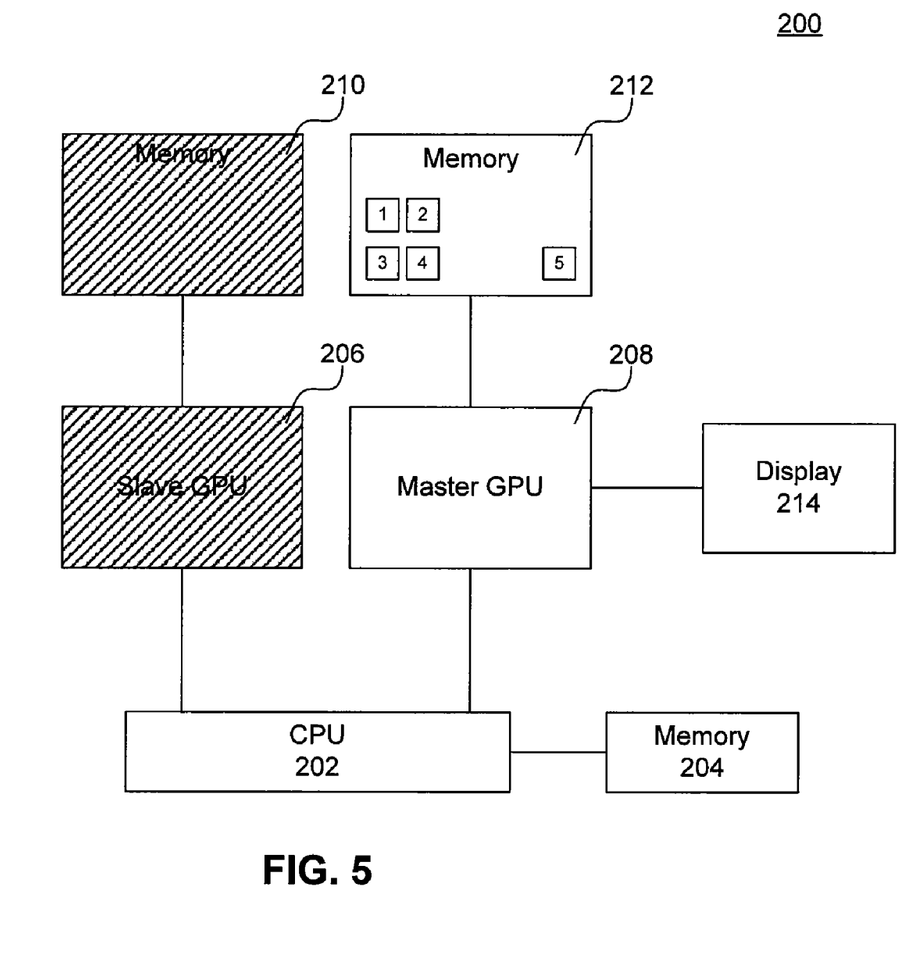

FIG. 5 shows a simplified diagram of system 200 after slave GPU 206 and memory 210 have been switched to sub-operational power states. As shown in FIG. 5, the contents of memory 210 have either been lost (because power was substantially shut down to those portions of the memory) or are no longer up to date (because memory has been switched to self refresh mode and the resources have been updated through graphics processing while slave GPU 206 was in the sub-operational power state).

As shown in FIG. 5, memory 212 stores resource 5. By copying resource 5 to memory 212 before the state transition, resource 5 is preserved. Master GPU 208 can continue to receive graphics tasks from CPU 202 and update resources stored in memory 212 (including resource 5) as it normally would. In an embodiment, the lookup table stored in memory 204 is updated to reflect that memory 206 no longer stores any up-to-date resources. In a further embodiment, the lookup table is also updated to reflect any changes in the contents of memory 212, e.g., updates to an existing resource or the presence of additional resources.

Figure 6:
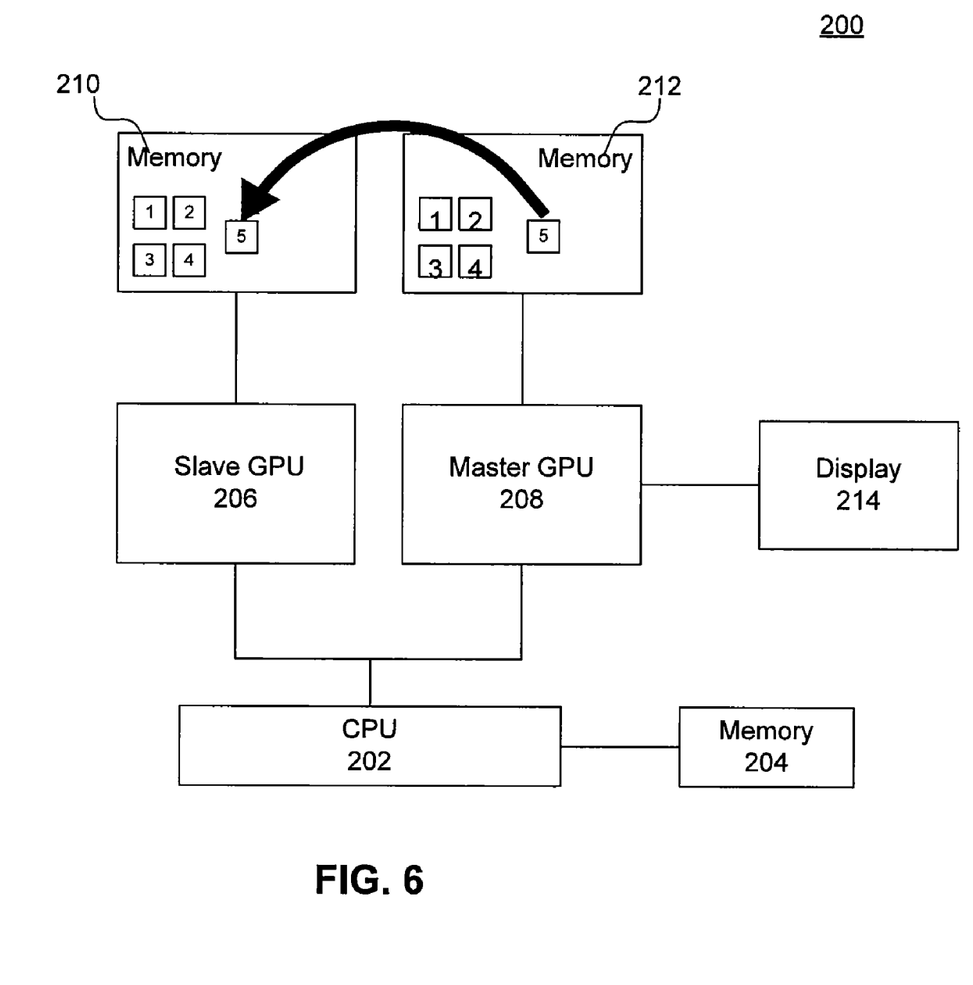

FIG. 6 shows a simplified diagram system 200 when slave GPU 206 and its associated memory 210 are returned to powered states. For example, configuration manager 216 can receive information indicating that the power source has been switched to AC power, e.g., wall socket power that can provide power for an essentially unlimited period of time making graphics performance more of a concern than power usage. In response, configuration manager 216 allows graphics responsibilities to assigned both slave GPU 206 and master GPU 208. Power manager module 220 receives the determined configuration and determines the power states for slave GPU 206 and master GPU 208 and their respective associated memories.

Specifically, power manager module 220 determines that GPUs 206 and 208 and memories 210 and 212 will be in powered states. Upon receiving information indicating that slave GPU 206 and memory 210 will be returned to powered states, resource manager module 224 accesses the lookup table stored in memory 204 (which has been updated to show the memory 210 does not include any up to date resources) to determine which resources on memory 210 that should be copied to memory 210. Resource manager module 224 then directs master GPU 208 and slave GPU 206 to copy resources 1-5 to memory 210. Thus, computing environment 200 is returned to the state shown in FIG. 3 and described above. GPUs 206 and 208 can continue to process graphics tasks normally, i.e., as if slave GPU 206 and memory 210 were not transitioned to sub-operational power states.

Figure 7:
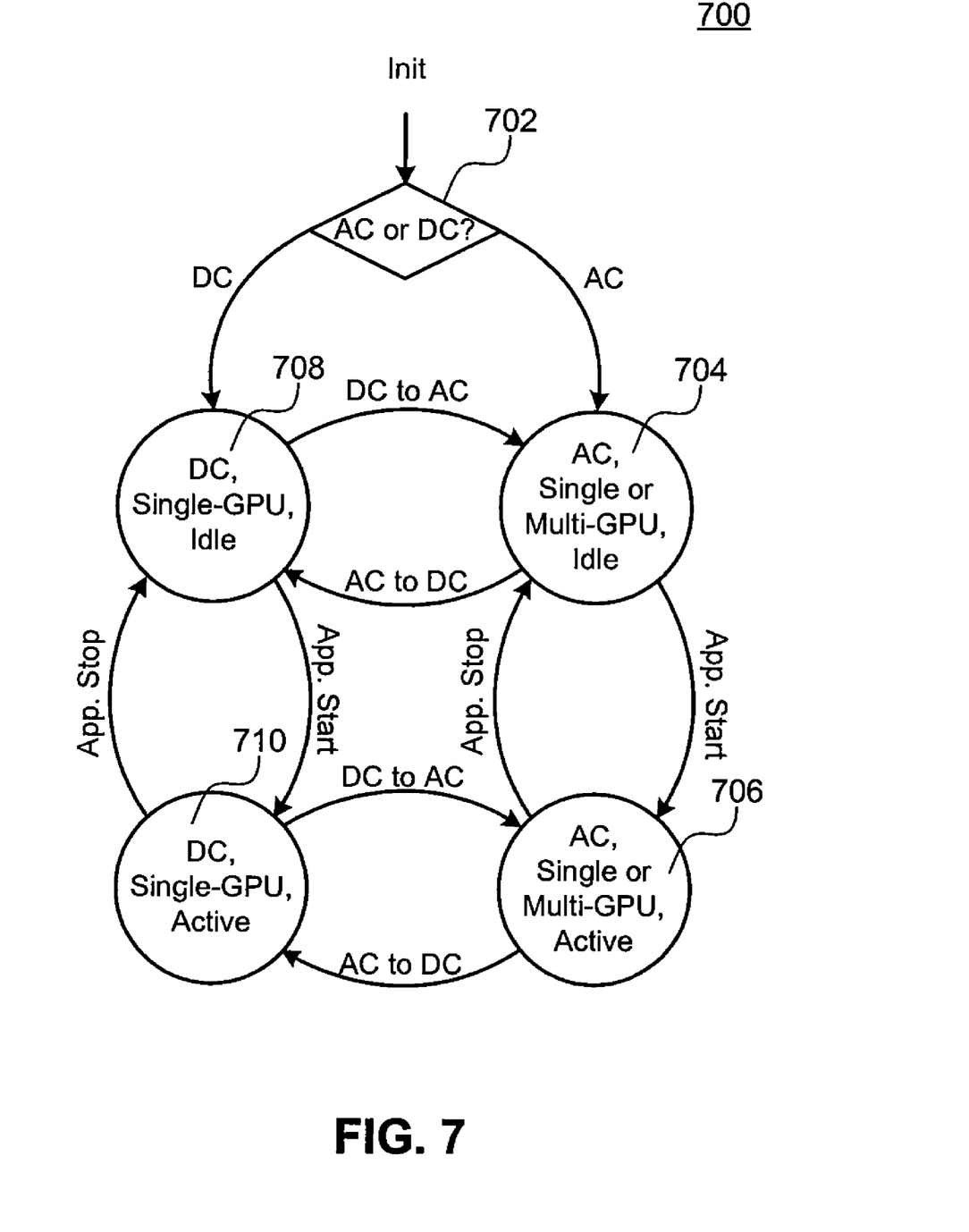
FIG. 7 is a state diagram illustrating an exemplary operation of a configuration manager, according to an embodiment of the present invention.

FIG. 7 shows a state diagram 700, according to an embodiment of the present invention. State diagram 700 illustrates the operation of configuration manager 216 in response to changes in the power source and the starting or stopping of an application that benefits from or requires increased graphics performance, e.g. a 3-D graphics game. Each state of state diagram 700 corresponds to a different GPU configuration, i.e., a different allocation of graphics processing responsibilities to the GPUs in the system. Based on the allocation responsibilities, power manager module 220 determines power states for each GPU in the system.

As shown in FIG. 7, state diagram 700 includes an initial decision 702 and states 704-710. When the system is initialized, configuration manager 216 makes initial decision 702 to determine whether the power source is AC power or DC power. If in initial decision step 702, it is determined that an AC power source is powering the system, configuration manager 216 enters state 704. In state 704, either a single or multi GPU configuration is used. For example, if the system is included in a desktop system, the system may immediately enter a multi-GPU state. Alternatively, if the system is included in a mobile system (e.g., a laptop), the system initially can enter a single GPU state. The other GPU(s) of the system would then be in sub-operational states. In either case, because a graphics application has not yet started, the GPU(s) in this configuration may be initially idle.

As shown in FIG. 7, once a graphics application begins, configuration manager 216 causes a transition to state 706. State 706 is substantially similar to state 704, except that the GPUs in the multi-GPU configuration are active, i.e., are processing graphics tasks. In the embodiment in which state 704 includes a single idle GPU, the system can determine whether the application would benefit from or requires multiple GPUs. In such a case, state 706 would include having multiple GPUs active. Otherwise, a single GPU would be used to process the graphics tasks.

If in initial decision step 702 configuration manager 216 determines that a DC power source is powering the system, configuration manager 216 directs the system to enter state 708. In state 708 a single GPU is made available to handle graphics processing tasks. For example, only the master GPU may be made available to handle graphics processing tasks. Power manager module 220 receives the determined responsibilities (i.e., that only the master GPU is available to handle graphics processing tasks) and determines that master GPU 208 is the only GPU that is in a powered state and the slave GPUs are in sub-operational power states. In an embodiment, state 708 can be substantially similar to state 704, except that the master GPU 208 may be in reduced power state due to DC power mode. In state 708, the master GPU 208 may be idle because no graphics processing applications have begun. Once a graphics processing application begins configuration manager 216 causes a transition to state 710 in which the master GPU is active.

Thus, a graphics application starting or stopping causes a transition from states 704 and 708 to states 706 and 710, respectively. A transition from DC to AC power, or vice versa, causes a transition between states 704 and 706, and states 708 and 710, respectively. Although state diagram 700 has been described with respect to system events including the switching of the power supply and the starting and stopping of a graphics processing application, those skilled in the relevant arts based on the description herein will recognize that configuration manager 216 can cause state transitions based on other system events, e.g., the level of battery power hitting a specific level, user input, etc.

Figure 8:
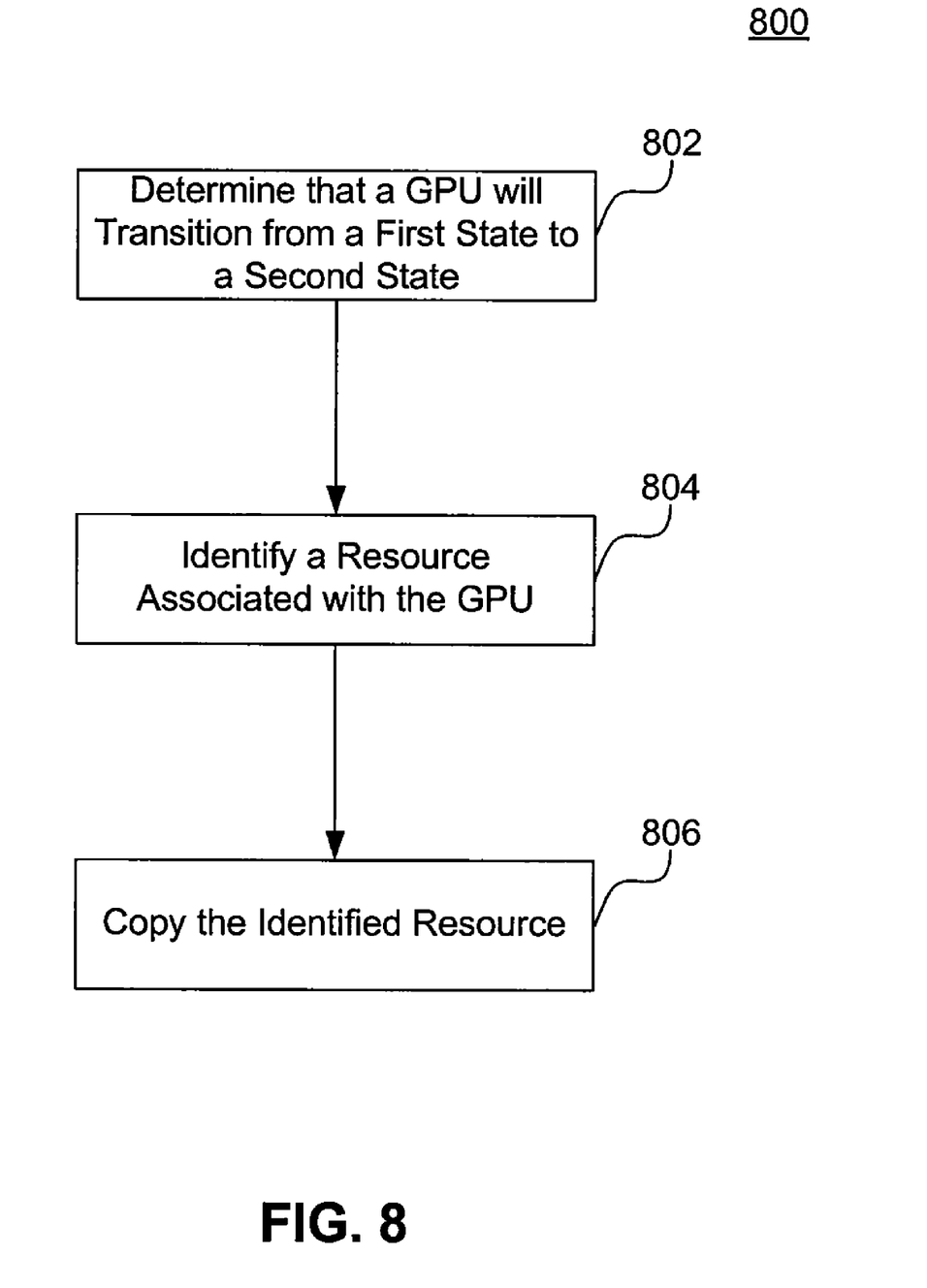
FIG. 8 is a flowchart of an exemplary method of managing resources in multi-graphics processing unit systems, according to an embodiment of the present invention The present invention will be described with reference to the accompanying drawings. Generally, the drawing in which an element first appears is typically indicated by the leftmost digit(s) in the corresponding reference number.

FIG. 8 is a flowchart of an exemplary method 800 of managing resources in multi-GPU systems, according to the present invention. Other structural and operational embodiments will be apparent to persons skilled in the relevant art(s) based on the following discussion. Flowchart 800 is described with reference to the embodiment of FIG. 2. However, flowchart 800 is not limited to that embodiment. The steps shown in FIG. 8 do not necessarily have to occur in the order shown. The steps of FIG. 8 are described in detail below.

In step 802, it is determined that a GPU will transition from a first state to a second state based on a detected system event. For example, in FIG. 2, configuration manager 216, based on the power source being switched from AC power to DC power, determines that slave GPU 206 will not have any graphics responsibilities. Accordingly, power manager module 220 then determines that slave GPU 206 will transition from a powered state to a sub-operational power state.

In another example, configuration manager 216, based on the power source being switched from DC power to AC power, determines that slave GPU 206 will be made available to handle graphics processing tasks. Accordingly, power manager module 220 determines that slave GPU 206 will transition from a sub-operational power state to a powered state.

In step 804, a resource associated with a GPU is identified. For example, in FIG. 2, based on the power state transition determined by power manager module 220, resource manager module 224 identifies resource 5 stored in memory 210 as being a resource that is stored in memory 210 and not in memory 212. Because memory resource is only stored in memory 210, it will be lost when memory 210 is switched to a sub-operational power state unless it is copied to a memory that will remain active after the state transition, e.g., memory 212. In an embodiment, resource manager module 224 identifies resource 5 by accessing the lookup table stored in memory 204.

In another embodiment, resource manager module 224, based on a determined state transition that slave 206 GPU will transition to a powered state, identifies resources not stored memory 210. For example, resource manager module 224 can access the lookup table stored in memory 204 to determine that memory 210 no longer has any up-to-date resources and can direct GPUs 206 and 208 to identify all resources stored in memory 212 to memory 210.

In step 806, the identified resource is copied. For example, in FIG. 2, resource manager module 224 through slave-specific module 226 and master-specific module 228 may direct slave GPU 206 and master GPU 208, respectively, such that memory resource 5 is copied from memory 210 to memory 212.

In another example, resource manager module 224 through slave-specific module 226 and master-specific module 228 may direct slave GPU 206 and master GPU 208 to copy the identified contents of memory 212 to memory 210, e.g., when slave GPU 206 transitions from a sub-operational power state to a powered state.

The steps of flowchart 800 have been described with reference to the embodiment in which GPUs are transitioned to different power states. As would be appreciated by those skilled in the relevant art(s), the steps of flowchart 800 may also be applied to embodiments including multiple processing devices, where one or more processing device is transitioned to a different power state, or to a single processing device including multiple processing cores, where one or more processing core is transitioned to a different power state.

The present invention may be embodied in hardware, software, firmware, or any combination thereof. Embodiments of the present invention or portions thereof may be encoded in many programming languages such as hardware description languages (HDL), assembly language, and C language. For example, an HDL, e.g., Verilog, can be used to synthesize, simulate, and manufacture a device, e.g., a processor, application specific integrated circuit (ASIC), and/or other hardware element, that implements the aspects of one or more embodiments of the present invention. Verilog code can be used to model, design, verify, and/or implement a processor that can scale frames using content-aware seam carving. For example, Verilog can be used to generate a register transfer level (RTL) description of logic that can be used to execute instructions so that a frame can be scaled using content-aware seam carving. The RTL description of the logic can then be used to generate data, e.g., graphic design system (GDS) or GDS II data, used to manufacture the desired logic or device. The Verilog code, the RTL description, and/or the GDS II data can be stored on a computer readable medium. The instructions executed by the logic to perform aspects of the present invention can be coded in a variety of programming languages, such as C and C++, and compiled into object code that can be executed by the logic or other device.

Aspects of the present invention can be stored, in whole or in part, on a computer readable media. The instructions stored on the computer readable media can adapt a processor to perform the invention, in whole or in part, or be adapted to generate a device, e.g., processor, ASIC, other hardware, that is specifically adapted to perform the invention in whole or in part.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of managing resources, comprising:
identifying a resource associated with a first graphics processor of a plurality of processors responsive to an impending transition of the first graphics processor from a first state to a second state, wherein at least a second graphics processor of the plurality of processors remains in a powered state both before and after the transition, wherein the identifying further comprises accessing a memory associated with a computer processing unit (CPU) to determine contents of a memory associated with the first graphics processor; and when the second state is a sub-operational state, copying the identified resource from a memory associated with the first graphics processor to the memory associated with the second graphics processor; and
when the second state is a powered state, copying the identified resource to the memory associated with the first graphics processor from the memory associated with the second graphics processor.

2. The method of claim 1, wherein the second state is the sub-operational state.

3. The method of claim 2, further comprising:
determining that the first graphics processor will be in the sub-operational state after the transition.

4. The method of claim 2, wherein the first graphics processor is a slave graphics processing unit (GPU) and the second graphics processor is a master GPU.

5. The method of claim 1, wherein the second state is the powered state.

6. The method of claim 5, wherein the first graphics processor is a slave graphics processing unit (GPU) and the second graphics processor is a master GPU.

7. The method of claim 1, wherein the second state is the sub-operational state and wherein the identifying comprises:
identifying resources that are stored in the memory associated with the first graphics processor and not stored in the memory associated with the second graphics processor using a lookup table stored in the memory associated with the CPU, wherein the copying the identified resource from the memory associated with the first graphics processor comprises:
copying only the identified resources to the memory associated with the second graphics processor.

8. The method of claim 1, further comprising:
identifying the impending transition based on a detected system event.

9. The method of claim 1, wherein the first state or the second state is a state in which memory refreshes are disabled for at least a portion of the memory associated with the first graphics processor.

10. A system for managing power, comprising:
a control processing unit (CPU); and
a memory in communication with the control processing unit (CPU), said memory for storing a plurality of processing instructions for directing said CPU to:
identify a resource associated with a first graphics processor responsive to an impending transition of the first graphics processor from a first state to a second state, wherein at least a second graphics processor of a plurality of processors remains in a powered state both before and after the transition, wherein to identify the resource the plurality of processing instructions further direct the CPU to access the memory in communication with the CPU to determine contents of a memory associated with the first graphics processor; and
when the second state is a sub-operational state, copy the identified resource from the memory associated with the first graphics processor to a memory associated with the second graphics processor; and
when the second state is a powered state, copy the identified resource to the memory associated with the first graphics processor from the memory associated with the second graphics processor.

11. The system of claim 10, wherein the second state is the sub-operational state.

12. The system of claim 11, further comprising a plurality of processing instructions for directing the CPU to:

determine that the first graphics processor will be in the sub-operational state.

13. The system of claim 11, wherein the first graphics processor is a slave graphics processing unit (GPU) and the second graphics processor is a master GPU.

14. The system of claim 10, wherein the second state is the powered state.

15. The system of claim 10, wherein the second state is the sub-operational state;
further comprising a plurality of processing instructions for directing the CPU to:
identify resources that are stored in the memory associated with the first graphics processor and not stored in the memory associated with the second graphics processor using a lookup table stored in the memory in communication with the CPU,
further comprising a plurality of processing instructions for directing the first graphics processor to:
copy only the identified resources to the memory associated with the second graphics processor.

16. A non-transitory computer readable medium carrying one or more sequences of one or more instructions for execution by one or more processors to perform a method of managing resources, the instructions when executed by the one or more processors, cause the one or more processors to:
identify a resource associated with a first graphics processor responsive to an impending transition of the first graphics processor from a first state to a second state, wherein at least a second graphics processor of a plurality of processors remains in a powered state both before and after the transition, wherein the identifying the resource further comprises accessing a memory associated with a control processing unit (CPU) to determine contents of a memory associated with the first graphics processor; and
when the second state is a sub-operational state, copy the identified resource from a memory associated with the first graphics processor to the memory associated with the second graphics processor; and
when the second state is a powered state, copy the identified resource to the memory associated with the first graphics processor from the memory associated with the second graphics processor.

17. The computer readable medium of claim 16, wherein the first graphics processor is a slave graphics processing unit (GPU) and the second graphics processor is a master GPU.

18. The computer readable medium of claim 16, further comprising the one or more processors to:
identify the impending transition based on a detected system event.

* * * * *